(12) United States Patent
Sun et al.

(10) Patent No.: US 11,477,082 B2
(45) Date of Patent: Oct. 18, 2022

(54) ENERGY CONSERVATION MANAGEMENT METHOD, APPARATUS, AND COMPUTER PROGRAM PRODUCT

(71) Applicant: HUAWEI TECHNOLOGIES CO., LTD., Shenzhen (CN)

(72) Inventors: Bing Sun, Nanjing (CN); Jianbing Wang, Nanjing (CN); Yan Zhuang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/656,162

(22) Filed: Oct. 17, 2019

(65) Prior Publication Data
US 2020/0127895 A1 Apr. 23, 2020

(30) Foreign Application Priority Data
Oct. 17, 2018 (CN) .......................... 201811210485.1

(51) Int. Cl.
*H04L 41/0833* (2022.01)
*H04L 41/0893* (2022.01)

(52) U.S. Cl.
CPC ...... *H04L 41/0833* (2013.01); *H04L 41/0893* (2013.01)

(58) Field of Classification Search
CPC . H04L 41/08; H04L 41/0803; H04L 41/0823; H04L 41/0833; H04L 41/0893;
(Continued)

(56) References Cited

U.S. PATENT DOCUMENTS

2009/0003229 A1* 1/2009 Loh .................... H04L 41/0833
370/252
2009/0112373 A1* 4/2009 Feldman ............... G06F 1/3209
700/286
(Continued)

FOREIGN PATENT DOCUMENTS

CN 105959975 A 9/2016
WO 2015082204 A1 6/2015

OTHER PUBLICATIONS

B. Addis, A. Capone, G. Carello, L. G. Gianoli and B. Sansò, "Energy Management Through Optimized Routing and Device Powering for Greener Communication Networks," in IEEE/ACM Transactions on Networking, vol. 22, No. 1, Feb. 2014, pp. 313-325 (Year: 2014).*
(Continued)

*Primary Examiner* — Hermon Asres
*Assistant Examiner* — William C McBeth
(74) *Attorney, Agent, or Firm* — Hauptman Ham, LLP

(57) ABSTRACT

An energy conservation management method includes selecting, by a policy server, a target scenario model from a plurality of scenario models based on a plurality of scenario attribute values of a target network, and configuring, by the policy server, a network device in the target network based on an energy conservation policy of the target scenario model. At least one of the plurality of scenario attribute values is an attribute value of a scenario attribute related to a network power consumption of the target network. The at least one of the plurality of scenario attribute values includes a plurality of attribute values of a corresponding scenario attribute, wherein each of the plurality of attribute values is collected at a different time from other attribute values of the plurality of attribute values that are collected at different times.

13 Claims, 2 Drawing Sheets

(58) Field of Classification Search
CPC ............. H04W 28/0221; H04W 52/02; H04W 52/0203; H04W 52/0206; Y02D 30/00; Y02D 30/70; Y02D 30/50
See application file for complete search history.

(56) References Cited

U.S. PATENT DOCUMENTS

| | | | |
|---|---|---|---|
| 2010/0002610 A1* | 1/2010 | Bowser | G06F 1/3209 370/311 |
| 2010/0037088 A1* | 2/2010 | Krivopaltsev | H04L 41/0893 714/4.1 |
| 2011/0183704 A1* | 7/2011 | Moreno | H04W 52/0203 455/522 |
| 2011/0243032 A1* | 10/2011 | Jenne | H04L 12/12 370/254 |
| 2013/0066477 A1* | 3/2013 | Jiang | H04L 41/0833 700/291 |
| 2013/0226320 A1* | 8/2013 | Berg-Sonne | G06Q 10/0631 700/90 |
| 2013/0258923 A1* | 10/2013 | Chou | H04W 52/0206 370/311 |
| 2013/0288686 A1* | 10/2013 | Chou | H04W 52/0203 455/436 |
| 2015/0023163 A1* | 1/2015 | Gonzalez | H04L 41/0833 370/230 |
| 2015/0067815 A1* | 3/2015 | Overcash | G06F 1/3209 726/11 |
| 2015/0208341 A1* | 7/2015 | Mohamed | H04L 41/0833 370/311 |
| 2015/0282069 A1* | 10/2015 | Hobbs | H04L 41/0833 370/252 |
| 2015/0333964 A1* | 11/2015 | Wang | H04L 41/0893 709/224 |
| 2016/0081016 A1 | 3/2016 | Xia et al. | |
| 2016/0091913 A1* | 3/2016 | Pani | G05F 1/66 700/291 |
| 2016/0291671 A1* | 10/2016 | Rider | H04L 41/0833 |
| 2017/0111233 A1* | 4/2017 | Kokkula | H04L 41/0823 |
| 2018/0248756 A1* | 8/2018 | Kaag | H04L 41/0833 |
| 2018/0270751 A1* | 9/2018 | Sukumaran | H04W 52/0206 |
| 2019/0196421 A1* | 6/2019 | Littlefield | G06Q 10/0639 |
| 2019/0342180 A1* | 11/2019 | Figueira | H04L 41/084 |

OTHER PUBLICATIONS

R. Nagareda, A. Hasegawa, T. Shibata and S. Obana, "A proposal of power saving scheme for wireless access networks with access point sharing," 2012 International Conference on Computing, Networking and Communications (ICNC), Maui, HI, 2012, pp. 1128-1132 (Year: 2012).*

Wang, You-Chiun, and Kai-Chung Chien. "A load-aware small-cell management mechanism to support green communications in 5G networks." 2018 27th Wireless and Optical Communication Conference (WOCC). IEEE, 2018. (Year: 2018).*

WO 2019/154371 A1, WIPO, Li et al., Aug. 2019, H04W24/02 (Year: 2019).*

Bolla, Raffaele, et al. "Energy efficiency in the future internet: a survey of existing approaches and trends in energy-aware fixed network infrastructures." IEEE Communications Surveys & Tutorials 13.2 (2010): 223-244. (Year: 2010).*

Giroire, Frederic, et al. "Minimization of network power consumption with redundancy elimination." Computer communications 59 (2015): 98-105. (Year: 2015).*

Sharma, Puneet, et al. "NEEM: Networkenergy efficiency manager." 2012 IEEE Network Operations and Management Symposium. IEEE, 2012. (Year: 2012).*

Heller, Brandon, et al. "Elastictree: Saving energy in data center networks." Nsdi. vol. 10. 2010. (Year: 2010).*

Blume, Oliver, et al. "Energy savings in mobile networks based on adaptation to traffic statistics." Bell Labs Technical Journal 15.2 (2010): 77-94. (Year: 2010).*

Dawoud, Safaa, et al. "Optimizing the power consumption of mobile networks based on traffic prediction." 2014 IEEE 38th Annual Computer Software and Applications Conference. IEEE, 2014. (Year: 2014).*

Extended European search report dated Feb. 20, 2020 from corresponding application No. EP 19203820.6.

Chinese Office Action issued in corresponding Chinese Application No. 201811210485.1, dated Nov. 4, 2020, pp. 1-7, State Intellectual Property Office of People's Republic of China, Beijing, China.

* cited by examiner

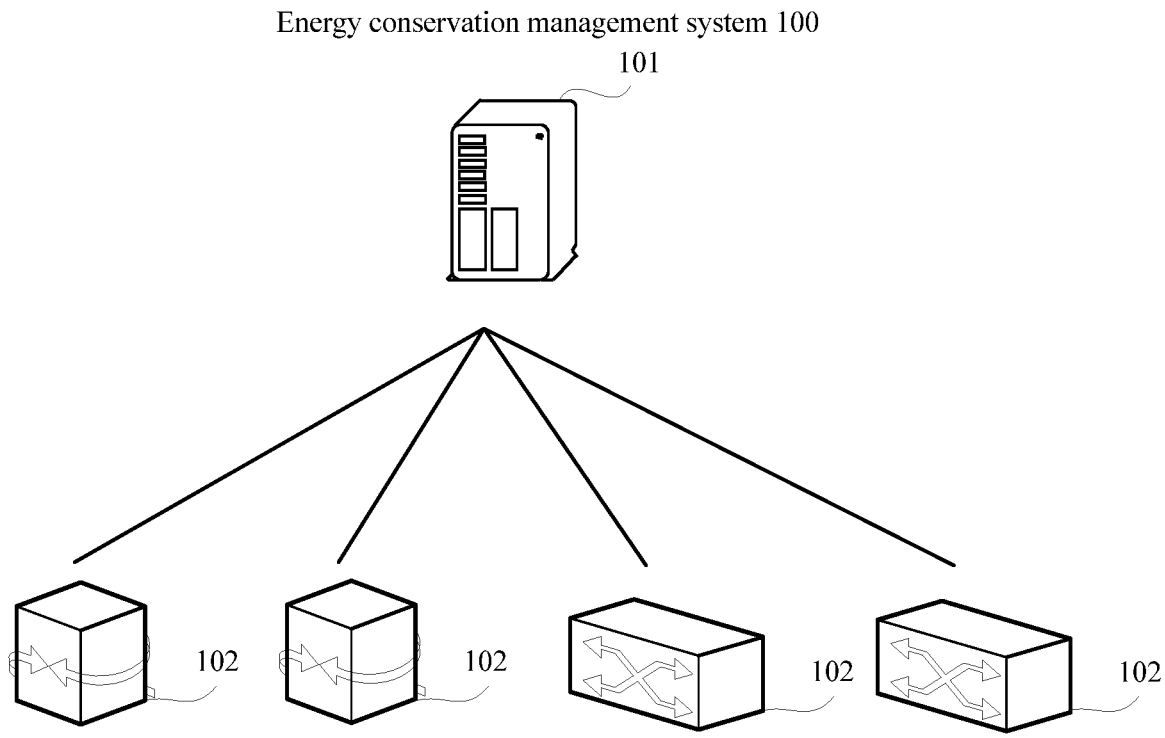

FIG. 1

A policy server selects a target scenario model from a plurality of scenario models based on a plurality of scenario attribute values of a target network, where any one of the plurality of scenario attribute values includes an attribute value of a scenario attribute related to network power consumption of the target network, and at least one of the plurality of scenario attribute values includes attribute values of a corresponding scenario attribute that are collected at different times — 201

The policy server configures a network device in the target network based on an energy conservation policy of the target scenario model — 202

FIG. 2

ENERGY CONSERVATION MANAGEMENT METHOD, APPARATUS, AND COMPUTER PROGRAM PRODUCT

CROSS-REFERENCE TO RELATED APPLICATION

This application claims priority to Chinese Patent Application No. 201811210485.1, filed on Oct. 17, 2018, which is hereby incorporated by reference in its entirety.

TECHNICAL FIELD

This application relates to the field of communications technologies, and in particular, to an energy conservation management method, an apparatus, and a storage medium.

BACKGROUND

A plurality of network devices, such as a switch, a router, and an access point (AP), are deployed in a network. If these network devices constantly stay in a working state, but there is no terminal that accesses the network, electric power is wasted.

In addition, if energy conservation management is performed manually on a network device in a specified network, massive workforces are also consumed.

SUMMARY

In at least one embodiment, the present disclosure includes an energy conservation management method, an apparatus, and a computer program product. In at least one embodiment, the present disclosure resolves a problem in other approaches for energy conservation management According to at least one embodiment, an energy conservation management method includes: selecting, by a policy server, a target scenario model from a plurality of scenario models based on a plurality of scenario attribute values of a target network, where at least one of the plurality of scenario attribute values is an attribute value of a scenario attribute related to a network power consumption of the target network, and at least one of the plurality of scenario attribute values includes a plurality of attribute values of a corresponding scenario attribute, wherein each of the plurality of attribute values is collected at a different time from other attribute values of the plurality of attribute values; and configuring, by the policy server, a network device in the target network based on an energy conservation policy of the target scenario model.

In at least one some embodiment, the target scenario model corresponding to the target network is determined, to obtain an energy conservation policy suitable for a power consumption scenario of the target network. Therefore, in some embodiments, energy conservation management may be performed automatically, thereby improving efficiency of energy conservation management performed on the target network compared with other approaches.

In at least one embodiment, each of the plurality of scenario models corresponds to one attribute list, and the one attribute list includes a plurality of scenario attribute value ranges; and the selecting the target scenario model from the plurality of scenario models based on the plurality of scenario attribute values of the target network includes: selecting, as the target scenario model from the plurality of scenario models, a scenario model having a maximum degree of matching with the target network, where a degree of matching the scenario model with the target scenario model is determined based on a quantity of matched attribute values of the target scenario model, and the quantity of matched attribute values of the target scenario model is a quantity of scenario attribute values of the plurality of scenario attribute values and are within a corresponding scenario attribute value range of the plurality of scenario attribute value ranges in the attribute list of the target scenario model.

In at least one some embodiment, an attribute list is configured for each scenario model. In these embodiments, after the plurality of scenario attribute values of the target network are determined, the target scenario model may be determined based on a degree of matching between the plurality of scenario attribute values of the target network and a plurality of attribute value ranges in each scenario model, so that the determined target scenario model can accurately describe the power consumption scenario of the target network, thereby improving accuracy in determining the target scenario model.

In at least one embodiment, a plurality of scenario attributes corresponding to the plurality of scenario attribute values include at least the network power consumption of the target network, a quantity of terminals accessing the target network, a traffic of the target network, or a quantity of network devices installed in each sub-area of a coverage area of the target network.

In some embodiments, the plurality of scenario attributes of the target network may include the foregoing content, to describe the power consumption scenario of the target network by using the scenario attribute values of the target network.

In at least one embodiment, the energy conservation policy of the target scenario model includes a plurality of energy conservation rules, each of the plurality of energy conservation rules including an energy conservation condition and an energy conservation action. In some embodiments, the energy conservation condition in at least one of the plurality of energy conservation rules includes a time segment in a time period, and the energy conservation condition is determined based on the at least one scenario attribute value.

In at least one some embodiment, the energy conservation policy of the target scenario model includes the plurality of energy conservation rules, and the energy conservation condition in the at least one of the plurality of energy conservation rules includes a time segment in a time period, so that different energy conservation rules are configured for the target network in different time segments, thereby improving flexibility of energy conservation management on the target network compared with other approaches.

According to at least one embodiment, an energy conservation management apparatus is provided, and the energy conservation management apparatus is configured to implement an action in the energy conservation management method according to the at least one embodiment. The energy conservation management apparatus includes at least one module, and the at least one module is configured to implement the energy conservation management method according to at least one embodiment.

According to at least one embodiment, an energy conservation management apparatus is provided. In some embodiments, a the energy conservation management apparatus includes a processor and a memory. The memory is configured to store a program that supports the energy conservation management apparatus in performing the energy conservation management method according to at least one embodiment, and store related data that is used to implement the energy conservation management method according to at least one embodiment. The processor is configured to execute the program stored in the memory. In at least one embodiment, the energy conservation management apparatus may further include a communications bus, and the communications bus is configured to establish a connection between the processor and the memory.

According to at least one embodiment, a computer readable storage medium is provided. The computer readable storage medium stores an instruction, and when the instruction is run on a computer, the computer is enabled to perform the energy conservation management method according to at least one embodiment.

According to at least one embodiment, a computer program product that includes an instruction is provided. When the computer program product is run on a computer, the computer is enabled to perform the energy conservation management method according to at least one embodiment.

Technical effects obtained in at least one embodiment are similar to the technical effects obtained by at least other embodiments, and are therefore. not described herein again for brevity.

DESCRIPTION OF DRAWINGS

FIG. 1 is a schematic diagram of an energy conservation management system according to an embodiment of the present disclosure;

FIG. 2 is a flowchart of an energy conservation management method according to an embodiment of the present disclosure;

DETAILED DESCRIPTION

Figure 3:
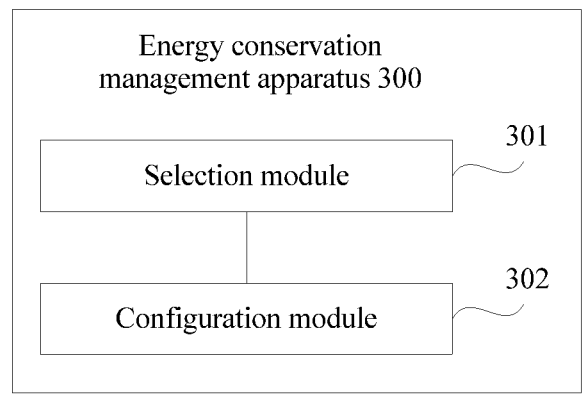
FIG. 3 is a schematic diagram of an energy conservation management apparatus according to an embodiment of the present disclosure.

Hereinafter, at least one embodiment of the present disclosure will be described in detail with reference to the accompanying drawings. However, it is understood that the following description is not limiting, and specific objectives, technical solutions, and/or advantages of the present disclosure may be described below to simplify the present disclosure, and are not limiting.

For a network deployed in any area, for example, a network deployed in a supermarket, a shopping mall, a hotel, or a stadium, various network devices are deployed in the network. Therefore, to help a terminal access the network at any time, these network devices constantly stay in a working state. As a result, power consumption of these network devices is relatively high. Therefore, a study on an energy conservation management method for performing energy conservation management on these network devices is carried out in the present disclosure, to reduce resource waste. The energy conservation management method provided in the embodiments of the present disclosure is applied to the foregoing scenario. A sum of power consumption of the network devices in the network is collectively referred to as network power consumption of the network.

FIG. 1 is a schematic diagram of an energy conservation management system according to an embodiment of the present disclosure. As shown in FIG. 1, the system 100 includes a policy server 101 and a plurality of network devices 102. The policy server 101 and each network device 102 are connected with wires or wirelessly, to communicate with each other.

The plurality of network devices 102 are deployed in a target network. In some embodiments, the target network may be a network deployed in a hotel, a network deployed in a shopping mall, a network deployed in a supermarket, a network deployed in an office campus, or the like. The policy server 101 is configured to determine an energy conservation policy for performing energy conservation management on the target network, and to configure each network device 102 based on the determined energy conservation policy.

During specific application, a controller for managing each network device 102 may be deployed in the target network. In this example, the controller in the target network may determine the energy conservation policy, and configure each network device 102 based on the determined energy conservation policy. However, the present disclosure is not limited to this embodiment of the present disclosure.

In addition, the network device 102 may be a switch, a router, an AP, or the like; and the policy server 102 may be a server such as an intelligent management platform for analyzing data.

FIG. 2 is a flowchart of an energy conservation management method according to an embodiment of the present disclosure. As shown in FIG. 2, the energy conservation management method includes at least one of the following operations.

In operation 201, a policy server selects a target scenario model from a plurality of scenario models based on a plurality of scenario attribute values of a target network, where at least one of the plurality of scenario attribute values includes an attribute value of a scenario attribute related to a network power consumption of the target network, and at least one of the plurality of scenario attribute values includes attribute values of a corresponding scenario attribute that are collected at different times.

In the present disclosure, to perform energy conservation management on the target network based on a power consumption scenario of the target network, the target scenario model corresponding to the target network is determined based on the plurality of scenario attribute values of the target network.

In at least this embodiment of the present disclosure, operation 201 may have the following implementations.

In at least one implementation, a plurality of scenario models are preset. In some embodiments, each scenario model corresponds to one attribute list, and the one attribute list includes a plurality of scenario attribute value ranges. In this example, operation 201 may be specifically as follows: A scenario model having a maximum degree of matching with the target network is selected from the plurality of scenario models as the target scenario model. A degree of matching the scenario model with the target scenario model is determined based on a quantity of matched attribute values of the target scenario model. The quantity of matched attribute values of the target scenario model is a quantity of scenario attribute values of the plurality of scenario attribute values and are within a corresponding scenario attribute value range of the plurality of scenario attribute value ranges in the attribute list of the target scenario model.

In some embodiments, each scenario attribute value range corresponds to one scenario attribute, and at least one of the plurality of scenario attribute value ranges includes an attribute value range of a corresponding scenario attribute in at least one time segment included in a time period. In some embodiments, at least one time segment included in a time period may be daytime and/or night in a day, a workday and/or a weekend in a week, or the like.

In some embodiments, the plurality of scenario attribute values of the target network are used to describe the power consumption scenario of the target network. In some embodiments, a plurality of scenario attributes corresponding to the plurality of scenario attribute values of the target network include at least one of the following: the network power consumption of the target network, a quantity of terminals accessing the target network, a traffic of the target network, and a quantity of network devices installed in each sub-area of a coverage area of the target network. In some embodiments, the plurality of scenario attributes may further include other attributes. In some embodiments, during specific application, the plurality of scenario attributes may be determined based on the power consumption scenario of the target network. Details are not described herein.

In some embodiments, the at least one of the plurality of scenario attribute values includes the attribute values of the corresponding scenario attribute that are collected at different times. The different times may be all hours or all days in a week, all hours or all days in a month, all hours or all days in a year, or the like. In some embodiments, the network power consumption of the target network may be a sum of power consumption of network devices in the target network, may be real-time power consumption of each network device, or may be rated power consumption of each network device. This is not specifically limited in the present disclosure.

For example, in some embodiments, the plurality of scenario attribute values include network power consumption of the target network in each hour in a recent week, a quantity of terminals accessing the target network in each hour in the recent week, traffic of the target network in each hour in the recent week, a quantity of APs installed on each floor in the coverage area of the target network, and the like. In some embodiments, for any preset scenario model such as a scenario model A, some scenario attribute value ranges in an attribute list of the scenario model A include attribute value ranges of a corresponding scenario attribute in daytime and at night. In this example, for any one of the plurality of scenario attribute values, the quantity of terminals accessing the target network in each hour in the recent week is used as an example for description. In some embodiments, an average value of quantities of terminals accessing the target network in daytime every day may be calculated, and an average value of quantities of terminals accessing the target network at night every day may be calculated. Then the two average values are compared with ranges in the attribute list of the scenario model A that are of quantities of terminals accessing the target network in day time and at night. If the two average values both fall within the ranges in the attribute list that are of the quantities of terminals accessing the target network in day time and at night, the scenario attribute values are determined as scenario attribute values matching the scenario model A. A quantity of scenario attribute values that are in the plurality of scenario attribute values and that match the scenario model A is a quantity of matched attribute values of the scenario model A.

In some embodiments, the attribute list of each of the plurality of scenario models may be obtained in advance by the policy server through big data analysis. Specifically, for a specified network, where the specified network may be a network in a shopping mall/supermarket scenario, a network in an office campus scenario, a network in a hotel scenario, or the like, at least one of data about time-varying network power consumption in the specified network, data about a time-varying quantity of terminals accessing the network, or data about time-varying traffic of the specified network is collected. In some embodiments, a scenario model corresponding to the specified network is determined based on the collected data, and an attribute list is configured for the scenario model based on the collected data.

In some embodiments, the data about the time-varying network power consumption of the specified network may be determined by using a plurality of attribute values of the network power consumption of the network that are collected at different times. In some embodiments, the data about the time-varying quantity of terminals accessing the specified network may be determined by using a plurality of attribute values that are of the quantity of terminals accessing the network and that are collected at different times. In some embodiments, the data about the time-varying traffic of the specified network may be determined based on a plurality of attribute values of the traffic of the network that are collected at different times.

For example, in some embodiments, if it is determined, based on the collected data, that network power consumption, a quantity of terminals, and traffic of the specified network at a weekend are all higher than corresponding network power consumption, a corresponding quantity of terminals, and corresponding traffic of the specified network in a workday, the scenario model corresponding to the specified network may be set to a shopping mall/supermarket scenario model. In some embodiments, an attribute list configured for the shopping mall/supermarket scenario model includes at least one of the following: two attribute value ranges of network power consumption respectively for a weekend and a workday, two attribute value ranges of a quantity of accessing terminals respectively for a weekend and a workday, or two attribute value ranges of traffic of the target network respectively for a weekend and a workday.

In at least one embodiment, the attribute list of each of the plurality of scenario models may be set manually by an administrator. Details are not described herein.

In at least one implementation, a scenario recognition model is trained in advance. In some embodiments, the scenario recognition model recognizes the power consumption scenario of the target network. In this example, operation 201 may be specifically as follows: The plurality of scenario attribute values of the target network are input into the scenario recognition model; the scenario recognition model analyzes the plurality of scenario attribute values and outputs a plurality of probabilities that are in a one-to-one correspondence with the plurality of scenario models, where the probability of each scenario model is used to indicate a probability that the power consumption scenario of the target network belongs to the scenario model; and a scenario model with a greatest probability is selected from the plurality of scenario models as the target scenario model.

In some embodiments, the scenario recognition model is obtained in advance by training a large quantity of training samples. In some embodiments, for each of the large quantity of training samples, the training sample is labeled with a corresponding scenario model. The training sample may include at least one of the following: data describing time-varying network power consumption of a network, data describing a time-varying quantity of terminals accessing the network, data including time-varying traffic of the network, or a quantity of network devices installed in each sub-area of a coverage area of the network. In some embodiments, the data about the time-varying network power consumption of the network may also be determined by using a plurality of attribute values of the network power consumption of the network that are collected at different times. In some embodiments, the data about the time-varying quantity of terminals accessing the network may also be determined by using a plurality of attribute values that are of the quantity of terminals accessing the network and that are collected at different times. In some embodiments, t data about the time-varying traffic of the network may also be determined based on a plurality of attribute values of the traffic of the network that are collected at different times.

In the foregoing implementations, the plurality of scenario models include a shopping mall/supermarket scenario model, a hotel scenario model, an office campus scenario model, a stadium scenario model, a meeting scenario model, a data center scenario model, or the like. This is not specifically limited in these embodiments of the present disclosure.

In operation 202, the policy server configures a network device in the target network based on an energy conservation policy of the target scenario model.

In some embodiments, operation 202 may be specifically as follows: The policy server centrally performs energy conservation management on network devices in the target network according to the energy conservation policy of the target scenario model. In at least one embodiment, operation 202 includes the policy server sending the energy conservation policy of the target scenario model to a controller in the target network; and the controller centrally performing energy conservation management on network devices in the target network according to the energy conservation policy of the target scenario model. In at least one embodiment, operation 202 includes the policy server sending the energy conservation policy of the target scenario model to each network device in the target network; and each network device performing energy conservation management on the network device according to the energy conservation policy of the target scenario model.

In at least this embodiment of the present disclosure, the energy conservation policy of the target scenario model may have the following implementations.

In at least a first implementation, to refine energy conservation management performed on the target network based on the power consumption scenario of the target network, the energy conservation policy of the target scenario model may include a plurality of energy conservation rules. In some embodiments, each of the plurality of energy conservation rules includes an energy conservation condition and an energy conservation action. In some embodiments, an energy conservation condition in at least one of the plurality of energy conservation rules includes a time segment in a time period. In other words, the energy conservation condition in the at least one of the plurality of energy conservation rules includes a time segment condition. In this way, different energy conservation management may be performed on the target network in different time segments, to improve flexibility of energy conservation management on the target network.

For example, in some embodiments, the target scenario model is a shopping mall/supermarket scenario model, and the energy conservation policy of the target scenario model includes four energy conservation rules, which are respectively a first energy conservation rule, a second energy conservation rule, a third energy conservation rule, and a fourth energy conservation rule. An energy conservation condition included in the first energy conservation rule is daytime of a workday, an energy conservation condition included in the second energy conservation rule is night of a workday, an energy conservation condition included in the third energy conservation rule is daytime of a weekend, and an energy conservation condition included in the fourth energy conservation rule is night of a weekend. In some embodiments, to be specific, for the shopping mall/supermarket scenario model, different energy conservation actions are set for daytime of a workday, night of a workday, daytime of a weekend, and nights of a weekend, to perform different energy conservation management in different time segments.

In some embodiments, the energy conservation condition including a time segment in a time period is determined based on at least one scenario attribute value. In some embodiments, the at least one scenario attribute value means that the scenario attribute value includes a plurality of attribute values of a corresponding scenario attribute that are collected at different times. In some embodiments, when different energy conservation management is performed on the target network in different time segments, time segment conditions included in some energy conservation conditions are determined based on a plurality of attribute values that are of some scenario attributes and that are collected at different times. In some embodiments, an energy conservation rule may be further configured flexibly based on an actual situation of the target network.

For example, in some embodiments, when the target network is a network deployed in a shopping mall/supermarket A, for the scenario attribute "the quantity of terminals accessing the target network", a scenario attribute value "a plurality of attribute values that are of the quantity of terminals accessing the target network and that are collected at different times" is collected. A result indicates that the quantity of terminals accessing the target network separately presents different features in daytime and night of a workday and daytime and night of a weekend. Therefore, the energy conservation policy configured for the target network may include the four energy conservation rules.

Moreover, in some embodiments, in addition to including the time segment condition, the energy conservation condition in the energy conservation rule may also include a parameter threshold condition. For example, in some embodiments, the energy conservation condition included in the first energy conservation rule may be that a corresponding quantity of accessed terminals in daytime of a workday is less than a threshold 200. In some embodiments, the parameter threshold condition may be preset, or certainly may be determined based on some scenario attribute values of the target network. Details are not described herein.

In at least a second implementation, to improve efficiency of energy conservation management, the energy conservation policy may not be refined. In this example, in some embodiments, the energy conservation policy of the target scenario model may include an energy conservation condition and an energy conservation action corresponding to the energy conservation condition.

In the foregoing implementations, if the policy server sends the energy conservation policy of the target scenario model to each network device in the target network, each network device performs energy conservation management on the network device according to the energy conservation policy of the target scenario model. In this example, for any network device in the target network, the policy server sends, to the network device, an energy conservation action and a corresponding energy conservation condition that are related to the network device in the energy conservation policy. After receiving the related energy conservation condition and energy conservation action, the network device performs the corresponding energy conservation action based on the energy conservation condition.

In some embodiments, if the energy conservation policy of the target scenario model is the energy conservation policy in the first implementation, there may be a plurality of energy conservation actions and corresponding energy conservation conditions that are related to the network device in the energy conservation policy, and each energy conservation condition includes a time segment condition or includes a time segment condition and a parameter threshold condition. In this example, an implementation in which the network device performs the corresponding energy conservation action based on the energy conservation condition is as follows: The network device determines an energy conservation condition in the plurality of energy conservation conditions that is met by a current state; and if the current state meets an energy conservation condition A in the plurality of energy conservation conditions, the network device performs an energy conservation action corresponding to the energy conservation condition A; or if the current state meets none of the plurality of energy conservation conditions, the network device does not perform an energy conservation operation. Subsequently, the process continues to be performed periodically.

In some embodiments, if the energy conservation condition includes a time segment condition and a parameter threshold condition, an implementation in which the network device determines whether the current state meets the energy conservation condition A is as follows: The network device simultaneously determines whether a current time meets the time segment condition in the energy conservation condition A and whether a corresponding parameter meets the parameter threshold condition in the energy conservation condition A. If yes, it indicates that the current state meets the energy conservation condition A.

For example, in some embodiments, the target scenario model is a shopping mall/supermarket scenario model, the network device is an AP, and energy conservation actions and corresponding energy conservation conditions that are related to the network device in the energy conservation policy include a first energy conservation condition and a first energy conservation action; and a second energy conservation condition and a second energy conservation action. The first energy conservation condition includes that a quantity of terminals accessing the target network at a weekend is less than a first quantity threshold, and the first energy conservation action includes disabling some antennas. The second energy conservation condition includes that a quantity of terminals accessing the target network in a workday is less than a second quantity threshold, and the second energy conservation action includes disabling the network device. In this example, after receiving the energy conservation action and the corresponding energy conservation condition that are related to the network device in the energy conservation policy, the AP determines whether a current state meets the first energy conservation condition or the second energy conservation condition; and if the current state meets the first energy conservation condition, the AP performs the first energy conservation action; or if the current state meets the second energy conservation condition, the AP performs the second energy conservation action. Subsequently, the operation is performed periodically.

If the energy conservation policy of the target scenario model is the energy conservation policy in the second implementation, there is one energy conservation action and one corresponding energy conservation conditions that are related to the network device in the energy conservation policy, and the energy conservation condition includes a time segment condition or includes a time segment condition and a parameter threshold condition. In this example, in some embodiments, an implementation in which the network device performs the corresponding energy conservation action based on the energy conservation condition is as follows: The network device determines whether a current state meets the energy conservation condition; if the current state meets the energy conservation condition, the network device performs the energy conservation action. In this example, the network device enters an energy conservation state. Subsequently, whether the current state meets the energy conservation condition is determined periodically. If the current state still meets the energy conservation condition, no operation is performed. If the current state does not meet the energy conservation condition, execution of the energy conservation action is stopped, and the network device enters a wakeup state.

For example, in some embodiments, the target scenario model is a shopping mall/supermarket scenario model, the network device is an AP, and an energy conservation action and a corresponding energy conservation condition that are related to the network device in the energy conservation policy include a third energy conservation condition and a third energy conservation action. The third energy conservation condition includes that a quantity of terminals accessing the target network at night is less than a third quantity threshold, and the third energy conservation action includes disabling some antennas. In this example, after receiving the energy conservation action and the corresponding energy conservation condition that are related to the network device in the energy conservation policy, the AP determines whether a current state meets the third energy conservation condition; and if the current state meets the third energy conservation condition, the AP performs the third energy conservation action. Subsequently, the operation is performed periodically.

Moreover, the energy conservation condition in at least this embodiment of the present disclosure may further include whether someone enters the coverage area of the target network. In this example, whether someone enters the coverage area may be detected by using data collected by a camera deployed in the coverage area of the target network. If it is detected that no one enters the coverage area, the energy conservation action corresponding to the energy conservation condition is performed. In this example, the network device enters an energy conservation state. If it is subsequently detected again that someone enters the coverage area, execution of the energy conservation action is stopped. In this way, the network device enters a wakeup state.

The energy conservation policy provided in at least this embodiment of the present disclosure is described below by using examples. Certainly, the following content constitutes no limitation on the energy conservation policy provided in at least this embodiment of the present disclosure.

For example, in some embodiments, for a shopping mall/supermarket scenario model, an energy conservation policy that is set may include at least one of the following items:

1. An AP and/or a switch are/is scheduled to power off at night. In this example, if the AP and the switch supply power to a terminal connected to the AP and the switch in a power over Ethernet (PoE) manner, after the AP and the switch are powered off, the terminal connected to the AP and the switch is also disabled correspondingly.

2. An AP and/or a switch work/works a minimum power consumption state at night, or the AP and/or the switch may be switched between a normal state and an energy conservation state by using a management instruction initiated by an administrator.

3. A quantity of antennas, power, and the like of an AP are adjusted based on a quantity of accessed terminals or a traffic status.

In some embodiments, for an office campus scenario model, an energy conservation policy that is set may include at least one of the following items:

1. A wired interface of an edge access switch and a PoE port of an AP are disabled as scheduled, and a PoE port and a data communications port of an AP in a corresponding area are enabled by using a management instruction based on a floor location.

2. An edge access switch works at a minimum power consumption state at night, or the edge access switch is switched between a normal state and an energy conservation state by using a management instruction.

3. A port of a switch chooses to enter a sleep mode or a wakeup state based on a port traffic status.

In some embodiments, for a stadium scenario model, an energy conservation policy that is set may include at least one of the following items:

1. A radio frequency antenna of an AP is automatically enabled or disabled based on a quantity of accessed terminals and/or traffic, to save energy.

2. A photographing area location of a camera is associated with an AP, an image collected by the camera is analyzed to learn a crowd density in a specified area, and an AP in a corresponding area is automatically enabled or disabled based on the crowd density.

In some embodiments, for a data center scenario model, an energy conservation policy that is set may be as follows: Based on a feature that traffic of a data center is reduced at night but the data center performs a backup operation, or another feature, some routers may be disabled at night, so that as many data flows as possible share a same path, and traffic is centralized at some nodes and ports. In this way, resources of other nodes and ports may be released, so that a network device or a port enters an energy conservation state or a sleep state. In some embodiments, all the routers are restored to a normal working state again during work time.

In addition, in at least this embodiment of the present disclosure, for any network device, in addition to an operation on the network device and/or an operation on another network device connected to the network device, energy conservation actions performed by the network device may include an operation on another terminal connected to the network device. For example, in a meeting scenario, a network device may control a peripheral terminal connected to the network device to perform an energy conservation operation. The peripheral terminal may be a terminal such as a printer or a projector.

Specifically, when these peripheral terminals are connected to a switch or an AP in a PoE manner, the switch or the AP is referred to as a power supply device, and the peripheral devices are referred to as powered devices. The power supply device supplies power by using a PoE port, the powered devices receive power by using the PoE port, and the power supply device and the powered devices transmit data to each other by using a data communications port. In this example, the switch or the AP may be controlled to disable the PoE port, so that these peripheral terminals passively enter a sleep state. Alternatively, the switch or the AP may be controlled to disable the data communications port. When these peripheral terminals detect that there is no traffic passing through the data communications port, these peripheral terminals automatically power off, to enter a sleep state.

In addition, if these peripheral terminals are directly connected to the controller in the target network, when performing an energy conservation action, the controller may directly instruct the peripheral terminals to power off or enter a sleep mode.

Moreover, if a single AP is deployed in the target network, the single AP may perform energy conservation management based on the determined energy conservation policy. In at least one embodiment, if the target network includes a plurality of APs, when there is no one accessing the target network or in a non-working period, the controller may select an AP at a personnel entry or a key channel port as a beacon AP, and the controller instructs other APs to enter a sleep state, for example, disabling some antennas and/or some modules. When the beacon AP discovers that there is an authorized person accessing the target network, or detects, by using an electromagnetic wave change, that someone enters a corresponding area, the beacon AP instructs the controller to wake up an adjacent AP, so that the AP enters a working state.

In addition, in this embodiment of the present disclosure, an energy conservation action may be a module-level energy conservation action, a network device-level energy conservation action, or a network-level energy conservation action. In some embodiments, the module-level energy conservation action includes some modules in a network device performing an energy conservation action, and other modules working normally. In some embodiments, the network device-level energy conservation action means that a network device entirely performs an energy conservation action. In some embodiments, the network-level energy conservation action means that all network devices in a network perform an energy conservation action performed.

For example, in some embodiments, the module-level energy conservation action includes that an Ethernet interface, a radio frequency identification (RFID)/Bluetooth/ZigBee module, or the like enters an energy conservation mode when there is no communication. In some embodiments, the energy conservation mode may be an energy efficient ethernet (EEE) mode. Alternatively, in some embodiments, the module-level energy conservation action may include that a multi-antenna system of a network device, such as an AP, disables some antennas or adjust transmit power consumption when a quantity of accessed terminals or traffic is less than a particular threshold.

In some embodiments, the network device-level energy conservation action includes that a switch and/or an AP enter/enters a sleep state when there is no accessed terminal or there is no traffic. In some embodiments, the network-level energy conservation action includes that a controller deployed in a network controls each network device to perform energy conservation management, to implement an entire network-level energy conservation management.

In the present disclosure, the target scenario model corresponding to the target network is determined, to obtain an energy conservation policy suitable for a power consumption scenario of the target network. Therefore, energy conservation management may be performed automatically, thereby improving efficiency of energy conservation management performed on the target network compared to other approaches.

FIG. 3 shows an energy conservation management apparatus according to an embodiment of the present disclosure. As shown in FIG. 3, the apparatus 300 includes:

a selection module 301, configured to perform operation 201 in the embodiment of FIG. 2; and a configuration module 302, configured to perform operation 202 in the embodiment of FIG. 2.

In at least one embodiment, each of the plurality of scenario models corresponds to one attribute list, and the one attribute list includes a plurality of scenario attribute value ranges; and the selection module 301 is specifically configured to:

select, as the target scenario model from the plurality of scenario models, a scenario model having a maximum degree of matching with the target network, where a degree of matching the scenario model with the target scenario model is determined based on a quantity of matched attribute values of the target scenario model, and the quantity of matched attribute values of the target scenario model is a quantity of scenario attribute values of the plurality of scenario attribute values and are within a corresponding scenario attribute value range in an attribute list of the target scenario model.

In at least one embodiment, a plurality of scenario attributes corresponding to the plurality of scenario attribute values include at least one of the following: the network power consumption of the target network, a quantity of terminals accessing the target network, a traffic of the target network, or a quantity of network devices installed in each sub-area of a coverage area of the target network.

In at least one embodiment, the energy conservation policy of the target scenario model includes a plurality of energy conservation rules, each of the plurality of energy conservation rules includes an energy conservation condition and an energy conservation action, an energy conservation condition in at least one of the plurality of energy conservation rules includes a time segment in a time period, and the energy conservation condition including a time segment in a time period that is determined based on at least one scenario attribute value.

In at least one embodiment of the present disclosure, the target scenario model corresponding to the target network is determined, to obtain an energy conservation policy suitable for a power consumption scenario of the target network. Therefore, energy conservation management of at least one embodiment of the present disclosure is performed automatically, thereby improving efficiency of energy conservation management performed on the target network compared with other approaches.

When the energy conservation management apparatus provided in at least the foregoing embodiment performs energy conservation management, division of the foregoing function modules is merely used as an example for illustration. In some embodiments, the foregoing functions may be allocated to different function modules and implemented based on a requirement, that is, an inner structure of a device is divided into different function modules to complete all or some of the functions described above. In some embodiments, the energy conservation management apparatus provided in the foregoing embodiments and the embodiments of the energy conservation management method belong to a same concept. For a specific implementation process thereof, refer to the method embodiment. Details are not described herein again.

It should be understood that the energy conservation management apparatus provided in at least one embodiment of the present disclosure may be implemented by using an application-specific integrated circuit (ASIC) or a programmable logic device (PLD). The PLD may be a complex programmable logical device (CPLD), a field-programmable gate array (FPGA), generic array logic (GAL), or any combination thereof. In addition, the energy conservation management method described in the foregoing embodiment may be implemented by software. In this example, the energy conservation management apparatus and the modules of the energy conservation management apparatus may also be referred to as software portions or modules.

In addition, the energy conservation management apparatus 300 provided in this embodiment of the present disclosure may correspondingly perform the energy conservation management method described in the embodiments of the present disclosure. Moreover, the foregoing and other operations and/or functions of the modules in the energy conservation management apparatus 300 are respectively intended to implement corresponding processes in the energy conservation management method described in the foregoing embodiment. For brevity, details are not described herein again. In other words, the foregoing modules may be integrated into the policy server shown in FIG. 1, to implement the energy conservation management method provided in the foregoing embodiment.

Figure 4:
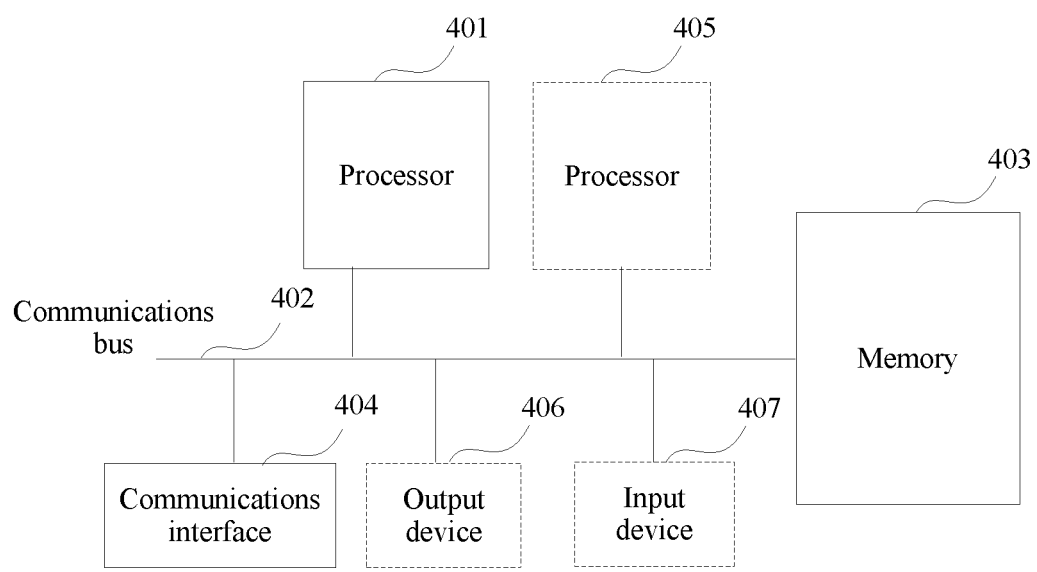
FIG. 4 is a schematic diagram of another energy conservation management apparatus according to an embodiment of the present disclosure.

FIG. 4 shows another energy conservation management apparatus according to an embodiment of the present disclosure. The policy server shown in FIG. 1 may be implemented by using the energy conservation management apparatus shown in FIG. 4. As shown in FIG. 4, the apparatus 400 includes at least one processor 401, a communications bus 402, a memory 403, and at least one communications interface 404.

The processor 401 may be a general-purpose central processing unit (CPU), a microprocessor, an ASIC, or one or more integrated circuits configured to control program execution of solutions of the present disclosure.

The communications bus 402 may include a channel for transferring information between the components in apparatus 400.

In some embodiments, the memory 403 may be a read-only memory (ROM) or another type of static storage device that can store static information and instructions, or a random access memory (RAM) or another type of dynamic storage device that can store information and instructions; or may be an electrically erasable programmable read-only memory (EEPROM), an optical disk, a magnetic disk storage medium or another magnetic storage device, or any other media that can be accessed by a computer and that can be configured to carry or store expected program code having an instruction or data structure form. However, other variations are within the scope of the present disclosure and are not limited thereto. For example, in some embodiments, memory 403 is not integrated with processor 403, but is connected to the processor 401 by using the communications bus 402. Alternatively, in some embodiments, the memory 403 may be integrated together with the processor 401.

The communications interface 404 is configured to use any apparatus such as a transceiver to communicate with another device or communications network, for example, an Ethernet, a radio access network (RAN), or a wireless local area network (WLAN).

In some embodiments, a computer device may include a plurality of processors, for example, a processor 401 and a processor 405 shown in FIG. 4. Each of the processors may be a single-core processor or may be a multi-core processor. The processor herein may be one or more devices, circuits, and/or processing cores for processing data (for example, a computer program instruction).

In some embodiments, the computer device may further include an output device 406 and an input device 407. The output device 406 communicates with the processor 401, and may display information in a plurality of manners. For example, the output device 406 may be a liquid crystal display (LCD), a light emitting diode (LED) display device, a cathode ray tube (CRT) display device, a projector (projector), or the like. The input device 407 communicates with the processor 405, and may receive user input in a plurality of manners. For example, the input device 407 may be a mouse, a keyboard, a touchscreen device, a sensor device, or the like.

The computer device may be a general-purpose computer device or a dedicated computer device. In some embodiments, the computer device may be a desktop computer, a portable computer, a network server, a palmtop computer (PDA), a mobile phone, a tablet computer, a wireless terminal device, a communications device, or an embedded device. A type of the computer device is not limited by the embodiments of the present disclosure.

The memory 403 is configured to store program code for executing the at least one operation or method of the present disclosure, and the execution is controlled by the processor 401. The processor 401 is configured to execute the program code stored in the memory 403. The program code may include one or more software portions or modules.

All or some of the foregoing embodiments may be implemented by using software, hardware, or a combination thereof. When software is used to implement the embodiments, the embodiments may be implemented completely or partially in a form of a computer program product. The computer program product includes one or more computer instructions. When the computer instructions are loaded and executed on a computer, the processes or functions according to the embodiments of the present disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a twisted pair) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid state drive (SSD)), or the like.

A person of ordinary skill in the art may understand that all or some of the operations of the embodiments may be implemented by hardware or a program instructing related hardware. The program may be stored in a computer-readable storage medium. The computer-readable storage medium may be a read-only memory, a magnetic disk, an optical disc, or the like.

The foregoing descriptions are descriptions of some embodiments provided in the present disclosure, but are not intended to limit the scope of the present. One of ordinary skill in the art would understand that variations, modifications, equivalent replacements, improvements thereof or the like can be made without departing from the scope and spirit of the present disclosure, and and shall fall within the scope of the present disclosure.

What is claimed is:

1. An energy conservation management method, wherein the method comprises:
    selecting, by a policy server, a target scenario model from a plurality of scenario models based on a plurality of scenario attribute values of a target network, wherein at least one of the plurality of scenario attribute values is an attribute value of a scenario attribute related to a network power consumption of the target network, and the at least one of the plurality of scenario attribute values comprises:
        a plurality of attribute values of a corresponding scenario attribute, wherein each of the plurality of attribute values is collected at a different time from other attribute values of the plurality of attribute values;
    configuring, by the policy server, a network device in the target network based on a plurality of energy conservation rules included in an energy conservation policy of the target scenario mode;
    wherein each of the plurality of scenario models corresponds to one attribute list, and the attribute list comprises a plurality of scenario attribute value ranges;
    wherein the selecting the target scenario model from the plurality of scenario models based on the plurality of scenario attribute values of the target network comprises:
        selecting, as the target scenario model from the plurality of scenario models, a scenario model having a maximum degree of matching with the target network, wherein a degree of matching of the target scenario model is determined based on a quantity of matched attribute values of the target scenario model, and the quantity of matched attribute values of the target scenario model is a quantity of scenario attribute values of the plurality of scenario attribute values of the target network and that fall within a corresponding scenario attribute value range in an attribute list of the target scenario model, wherein the degree of matching when selecting the target scenario model from the plurality of scenario models means a degree of matching between the plurality of scenario attribute values of the target network and the plurality of attribute value ranges in each scenario model; and
    wherein the plurality of scenario attribute values of the target network correspond to scenario attributes comprising at least:
        the network power consumption of the target network, a quantity of terminals accessing the target network, a traffic of the target network, and a quantity of the network devices installed in each sub-area of a coverage area of the target network.

2. The method according to claim 1, wherein an energy conservation condition in at least one of the plurality of energy conservation rules comprises a time segment in a time period determined based on the at least one of the plurality of scenario attribute values.

3. The method according to claim 1, wherein the configuring the network device in the target network based on the plurality of energy conservation rules included in the energy conservation policy of the target scenario model comprises:

configuring an energy state of at least one port of the network device, wherein the configuring the energy state of the at least one port of the network device comprises disabling or enabling a Power over Ethernet (PoE) port.

4. The method according to claim 1, wherein the configuring the network device in the target network based on the plurality of energy conservation rules included in the energy conservation policy of the target scenario model comprises:
configuring an energy state of at least one port of the network device, wherein the configuring the energy state of the at least one port of the network device comprises disabling or enabling a data communications port.

5. The method according to claim 1, wherein the configuring the network device in the target network based on the plurality of energy conservation rules included in the energy conservation policy of the target scenario model comprises:
configuring an energy state of at least one port of the network device, wherein the configuring the energy state of the at least one port of the network device comprises centralizing network traffic through one port and disabling at least another port.

6. A policy server, wherein the policy server comprises:
a memory configured to store computer executable instructions, and
a processor coupled to the memory, wherein the processor is configured to execute the computer executable instructions for:
selecting a target scenario model from a plurality of scenario models based on a plurality of scenario attribute values of a target network, wherein at least one of the plurality of scenario attribute values is an attribute value of a scenario attribute related to a network power consumption of the target network, and the at least one of the plurality of scenario attribute values comprises:
a plurality of attribute values of a corresponding scenario attribute, wherein each of the plurality of attribute values is collected at a different time from other attribute values of the plurality of attribute values;
configuring a network device in the target network based on a plurality of energy conservation rules included in an energy conservation policy of the target scenario model;
wherein each of the plurality of scenario models corresponds to one attribute list, and the attribute list comprises a plurality of scenario attribute value ranges;
wherein the selecting the target scenario model from the plurality of scenario models based on the plurality of scenario attribute values of the target network comprises:
selecting, as the target scenario model from the plurality of scenario models, a scenario model having a maximum degree of matching with the target network, wherein a degree of matching of the target scenario model is determined based on a quantity of matched attribute values of the target scenario model, and the quantity of matched attribute values of the target scenario model is a quantity of scenario attribute values of the plurality of scenario attribute values of the target network and that fall within a corresponding scenario attribute value range in an attribute list of the target scenario model, wherein the degree of matching when selecting the target scenario model from the plurality of scenario models means a degree of matching between the plurality of scenario attribute values of the target network and the plurality of attribute value ranges in each scenario model; and
wherein the plurality of scenario attribute values of the target network correspond to scenario attributes comprising at least:
the network power consumption of the target network, a quantity of terminals accessing the target network, a traffic of the target network, and a quantity of the network devices installed in each sub-area of a coverage area of the target network.

7. The policy server according to claim 6, wherein the configuring the network device in the target network based on the plurality of energy conservation rules included in the energy conservation policy of the target scenario model comprises:
configuring an energy state of at least one port of the network device, wherein the configuring the energy state of the at least one port of the network device comprises disabling or enabling a Power over Ethernet (PoE) port.

8. The policy server according to claim 6, wherein the configuring the network device in the target network based on the plurality of energy conservation rules included in the energy conservation policy of the target scenario model comprises:
centralizing traffic at some nodes and ports, wherein the centralizing the traffic at some nodes and ports comprises disabling or enabling a data communications port.

9. The policy server according to claim 6, wherein the configuring the network device in the target network based on the plurality of energy conservation rules included in the energy conservation policy of the target scenario model comprises:
centralizing traffic at some nodes and ports, wherein the centralizing the traffic at some nodes and ports comprises centralizing network traffic through one port and disabling at least another port.

10. A computer program product, comprising a non-transitory, computer-readable storage medium containing instructions therein which, when executed by a processor, cause the processor to:
select a target scenario model from a plurality of scenario models based on a plurality of scenario attribute values of a target network, wherein at least one of the plurality of scenario attribute values is an attribute value of a scenario attribute related to a network power consumption of the target network, and the at least one of the plurality of scenario attribute values comprises:
a plurality of attribute values of a corresponding scenario attribute, wherein each of the plurality of attribute values is collected at a different time from other attribute values of the plurality of attribute values;
configure a network device in the target network based on a plurality of energy conservation rules included in an energy conservation policy of the target scenario model;
wherein each of the plurality of scenario models corresponds to one attribute list, and the attribute list comprises a plurality of scenario attribute value ranges;

wherein the select a target scenario model from the plurality of scenario models based on the plurality of scenario attribute values of the target network comprises:
  select, as the target scenario model from the plurality of scenario models, a scenario model having a maximum degree of matching with the target network, wherein a degree of matching of the target scenario model is determined based on a quantity of matched attribute values of the target scenario model, and the quantity of matched attribute values of the target scenario model is a quantity of scenario attribute values of the plurality of scenario attribute values of the target network and that fall within a corresponding scenario attribute value range in an attribute list of the target scenario model, wherein the degree of matching when selecting the target scenario model from the plurality of scenario models means a degree of matching between the plurality of scenario attribute values of the target network and the plurality of attribute value ranges in each scenario model; and
wherein the plurality of scenario attribute values of the target network correspond to scenario attributes comprising at least:
  the network power consumption of the target network, a quantity of terminals accessing the target network, a traffic of the target network, and a quantity of the network devices installed in each sub-area of a coverage area of the target network.

11. The computer program product according to claim 10, wherein the configure the network device in the target network based on the plurality of energy conservation rules included in the energy conservation policy of the target scenario model comprises:
  centralizing traffic at some nodes and ports, wherein the centralizing the traffic at some nodes and ports comprises disabling or enabling a Power over Ethernet (PoE) port.

12. The computer program product according to claim 10, wherein the configure the network device in the target network based on the plurality of energy conservation rules included in the energy conservation policy of the target scenario model comprises:
  centralizing traffic at some nodes and ports, wherein the centralizing the traffic at some nodes and ports comprises disabling or enabling a data communications port.

13. The computer program product according to claim 10, wherein the configure the network device in the target network based on the plurality of energy conservation rules included in the energy conservation policy of the target scenario model comprises:
  centralizing traffic at some nodes and ports, wherein the centralizing the traffic at some nodes and ports comprises centralizing network traffic through one port and disabling at least another port.

* * * * *